(12) United States Patent
Nakano (10) Patent No.: US 6,385,157 B1
(45) Date of Patent: May 7, 2002

(54) OPTICAL PICK-UP DEVICE

(75) Inventor: Osamu Nakano, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/734,513

(22) Filed: Dec. 11, 2000

(51) Int. Cl.$^7$ ................................................. G11B 7/12
(52) U.S. Cl. ............................... 369/112.02; 369/44.24; 369/94; 369/118
(58) Field of Search ........................... 369/44.11, 44.12, 369/44.14, 44.33, 44.24, 47.1, 53.1, 59.1, 94, 112.01, 112.02, 118

(56) References Cited

U.S. PATENT DOCUMENTS 5,621,717 A * 4/1997 Finkelstein et al. ..... 369/112.16
5,793,734 A * 8/1998 Tsuchiya et al. ............ 369/118
6,226,233 B1 * 5/2001 McDaniel et al. ... 369/44.22 X

FOREIGN PATENT DOCUMENTS

| JP | 7-272337 | 10/1995 |
| JP | 8-185640 | 7/1996 |

OTHER PUBLICATIONS

T. Wilson: "Confocal Microscopy", U.S. edition published by Academic Press Inc., San Diego, CA, 1990, pp. 93–99.

* cited by examiner

*Primary Examiner*—Muhammad Edun
(74) *Attorney, Agent, or Firm*—Frishauf, Holtz, Goodman, Langer & Chick, P.C.

(57) ABSTRACT

An optical pick-up device for use in an information recording/reproducing apparatus for recording and/or reproducing information on an optical record medium. The device comprises a semiconductor laser, an information record medium having plural record layers laminated thereon, an outward route system for irradiating laser light from the semiconductor laser onto the information record medium through a beam splitter and objective lens, and an inward route system having a light detector for receiving the light reflected from the information record medium and transmitted through the objective lens, the beam splitter and pin-hole. The pin-hole has a radius, which is decided in such a manner that an expression $Vp=2\pi r/(\lambda/NA)$ satisfies following condition $3 \leq Vp \geq 6$, wherein r is radius of the pin-hole, NA is lens aperture of the detection system, $\lambda$ is wave length of the laser light, and Vp is radius of Airy disc.

14 Claims, 6 Drawing Sheets

FIG. 6

OPTICAL PICK-UP DEVICE

BACKGROUND OF THE INVENTION

1. Field of the Invention

The present invention relates to an optical pick-up device for recording and reproducing information from an information record medium having plural record layers in direction of depth.

2. Related Art Statement

This kind of optical pick-up device has been described in for example Japanese Patent Application Laid-open No. 185640/1996. Such an optical pick-up device comprises an outward route optical system in which a laser light from a semiconductor laser is collimated to form a light flux by a collimator lens, afterwards, is reflected with a beam splitter and is irradiated on a multi-layer optical disc by an objective lens, and comprises an inward route optical system in which the reflected light after being transmitted through the beam splitter and the objective lens is received on an optical detector through a diaphragm lens and a pin-hole, thereby reproducing the information recorded on the desired record layer.

Herein, the diameter D of the pin-hole is made a value calculated by the following expression (1), assuming that in order to transmit the reflected light from the desired record layer and to irradiate it on the light detector incident, η is lateral magnification of the reflected light detection system, NAob is a numerical aperture of the objective lens, $f_1$ is a focal distance of the objective lens, $f_2$ is a focal distance of the diaphragm lens, d is a distance between respective record layers of multi-layer optical disk, and n is a refractive index of the disc substrate, $$D=(1/5)\{\eta^2 \cdot NA \cdot f_1)/(f_2+2\eta^2 d/n)\}(d/n) \quad (1)$$

Therefore, assuming that for example, $\eta=10$, $NA_{ob}=0.55$, $f_1=3$ mm, $f_2=30$ mm, $d=0.007$ mm, and $n=1.56$, the diameter D of the pin-hole becomes D≈4.8 μm.

By the way, in the optical pick-up device as described above, assuming that r is a pin-hole radius, λ is a utilizing wave length, $NA_{dp}$ is a numerical aperture of tie diaphragm lens, and Vp is a pin-hole diameter (radius of Airy image) standardized by the utilizing wave length λ and the numerical aperture $NA_{dp}$, Vp can be represented as described by the following expression (2) as shown in CONFOCAL MICROSCOPY (Wilson,T) 1990. ACADEMIC PRESS INC.

$$Vp=2\pi \cdot r/(\lambda/NAd_p) \quad (2)$$

Figure 4:
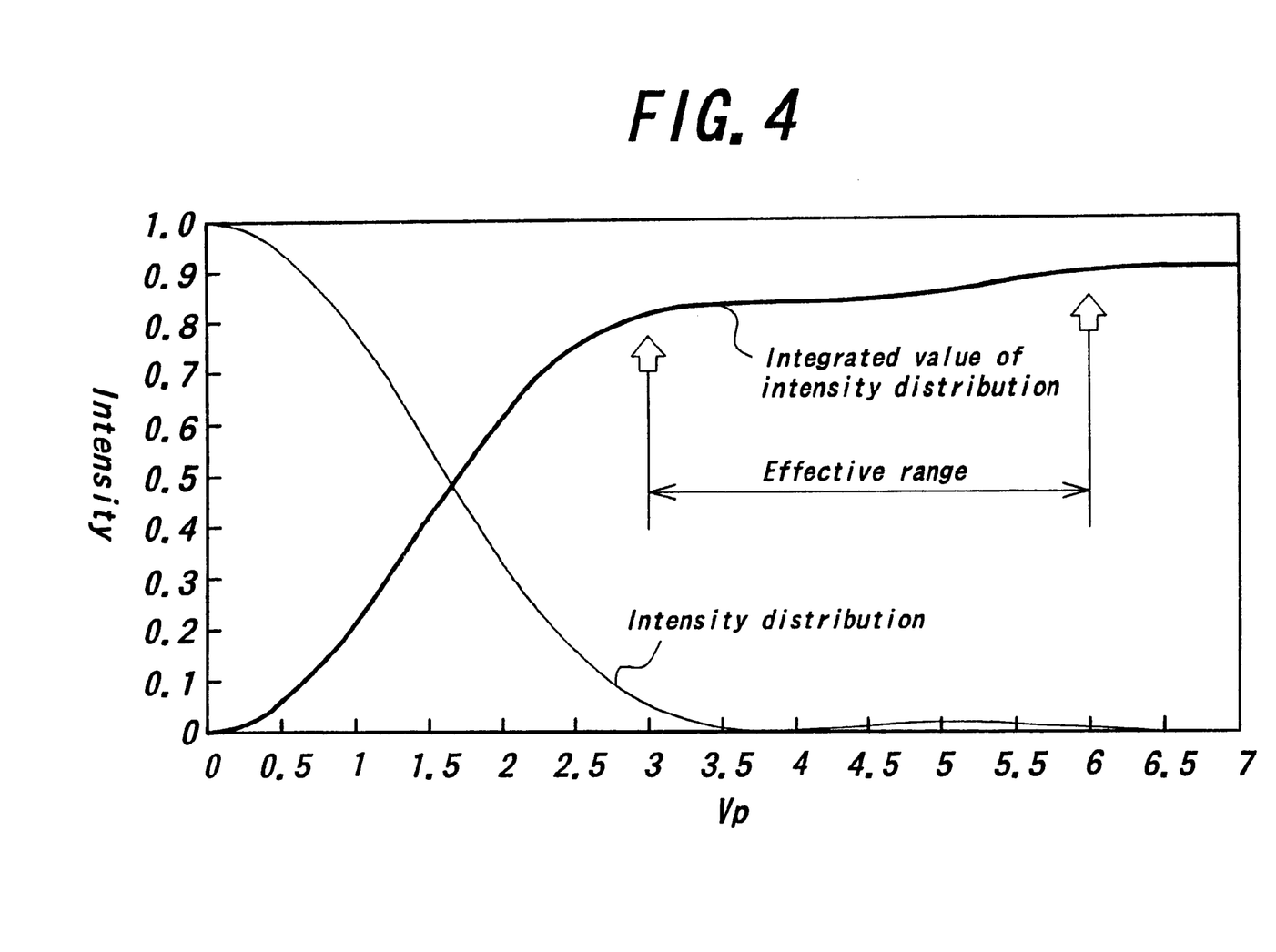
FIG. 4 is a diagram showing an intensity integral value and a profile of Airy image to pin-hole diameter Vp standardized by the utilizing wave length and the numerical aperture of the detection system.

Moreover, the profile of Airy image of the spot formed on pin-hole plane (intensity distribution) becomes as shown in FIG. 4 by thin line, and thus Airy disc radius becomes Vp=3.8, so that intensity integral value from the spot center becomes as shown in FIG. 4 by thick line.

Herein, assuming that for example λ=0.68 μm, numerical aperture $NA_{dp}$ of the diaphragm lens in the above case becomes $NA_{dp}$=0.055, since the numerical aperture of the objective lens is $NA_{ob}$0.55, and $f_1/f_2$=1/10, so that the spot diameter of the luminous flux incident on the pin-hole plane becomes substantially 15 μm from the above expression (2), at Vp=3.8.

Therefore, in the conventional optical pick-up device described above, assuming that pin-hole diameter D is 4.8 μm (Vp at this time becomes Vp≈1.2) calculated by the above expression (1), the quantity of light transmitted through the pin-hole becomes below the half, and thus the utilizing efficiency of reflected light from the desired record layer of the multi-layer optical disc is decreased.

On the other hand, in the case of the recording medium having single layer, the reflected light from the recording medium is usually 10%–90%, and in the case of the recording medium having plural recording layers and recording the pit data on the recording layer by focusing the record beam to the position of desired depth in the medium which uses for example photo polymer, photo-refractive crystal, and photochromic material, etc. and by changing the refractive index and the light absorption coefficient thereof, the reflected light is very small and also 0.1% or less.

In such a way, in the conventional optical pick-up device described above, the light quantity incident on the photo detector becomes significantly decreased, so that the photo multiplexer and the avalanche photo diode each having current amplification function as photo detector must be used.

However, in case of using the photo detector having such a current amplification function, the high voltage is required, and the temperature compensation circuit is required, so that problems lie in that the circuit structure becomes complicated, and expensive and that the power consumption becomes increased, too.

SUMMARY OF THE INVENTION

The present invention has performed by considering the conventional problem particular.

The present invention has for its object to provide an optical pick-up device capable of efficiently receiving reflected light from the information record medium having the plural record layers in the direction of depth through the pin-hole, and capable of accurately reproducing the information recorded on the desired record layer.

According to the present invention, there is provided an optical pick-up device comprising: a semiconductor laser, an information record medium having plural record layers laminated thereon, an outward route system for irradiating laser light from the semiconductor laser on to the information record medium through a beam splitter and objective lens, and an inward route system having a light detector for receiving the light reflected from the information record medium transmitted through the objective lens, through the beam splitter and pin-holes; the pin-hole has a radius, which is decided in such a manner that an expression Vp=2πr/λ/NA) satisfies following condition 3≦Vp≧6, wherein r is radius of the pin-hole, NA is lens aperture of the detection system, λ is wave length of the laser light, and Vp is radius of Airy disc.

As has been seen from FIG. 4, intensity integral value in pin-hole plane becomes 80% or more in the range 3≦Vp, and becomes decreases rapidly in the range 3>Vp. Therefore, if the radius of the pin-hole is set to satisfy the range 3≦Vp, the light amount incident on the optical detector can be increased, and the utilizing efficiency of reflected light from the information record medium can be improved.

Figure 5:
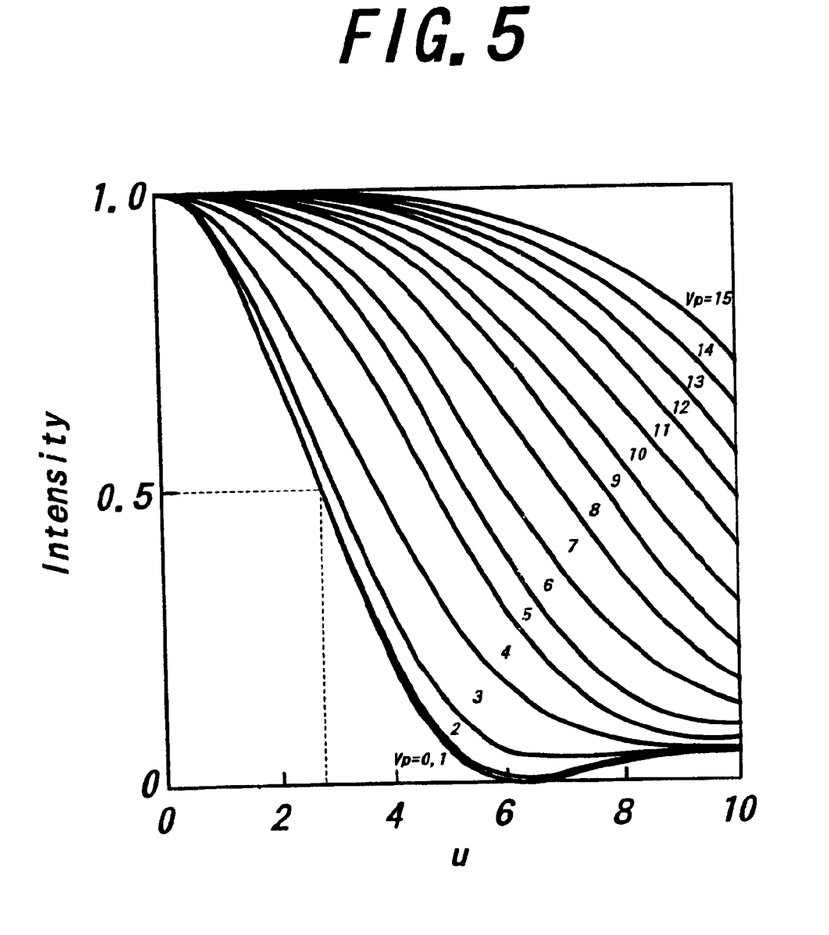
FIG. 5 is a diagram showing intensity distribution in the direction of focal depth of the objective lens to the radius Vp of Airy disc.

However, Vp is made large, leakage-in of the signal from a record layer adjacent to the desired record layer becomes large, and thus the resolution may be decreased. FIG. 5 shows intensity distribution in the direction of focal depth of the objective lens capable of being limited for the pin-hole radius Vp shown in FIG. 4. Herein, parameter u plotted on abscissa is a parameter shown by normalizing the value in the direction of focal depth with the utilizing wave length λ and the numerical aperture $NA_{ob}$ ($NA_{ob}$=sin α) of the objective lens, with the use of the following expression (3). Moreover, z shows an actual focal depth. Moreover, this depth is shown by an air converted length, for the sake of simplicity. That is, actually, the plural record layers are formed by intervening a transparent plastic substrate, so that The refractive index of the plastic substrate should be considered for a focal depth, but for convenience of explanation, the focal depth is designated by a length in the state without plastic substrate, that is, a length converted into the refractive index (1.0) of the air.

$$U = (8\pi/\lambda) \, z \, \sin^2(\alpha/2) \quad (3)$$

In the expression (3), assuming that $\lambda = 0.68 \, \mu m$, the parameter u becomes as shown in following table.

TABLE 1

| NA$_{ob}$ | u | | | | | | | | | μm |
|---|---|---|---|---|---|---|---|---|---|---|
| | 1 | 2 | 3 | 4 | 5 | 6 | 7 | 8 | 9 | 10 |
| 0.45 | 0.51 | 1.01 | 1.52 | 2.02 | 2.53 | 3.04 | 3.54 | 4.05 | 4.55 | 5.06 |
| 0.50 | 0.40 | 0.81 | 1.21 | 1.62 | 2.02 | 2.42 | 2.83 | 3.23 | 3.64 | 4.04 |
| 0.55 | 0.33 | 0.66 | 0.98 | 1.31 | 1.64 | 1.97 | 2.30 | 2.63 | 2.95 | 3.28 |
| 0.60 | 0.27 | 0.54 | 0.81 | 1.08 | 1.35 | 1.62 | 1.89 | 2.16 | 2.44 | 2.71 |

Figure 6:
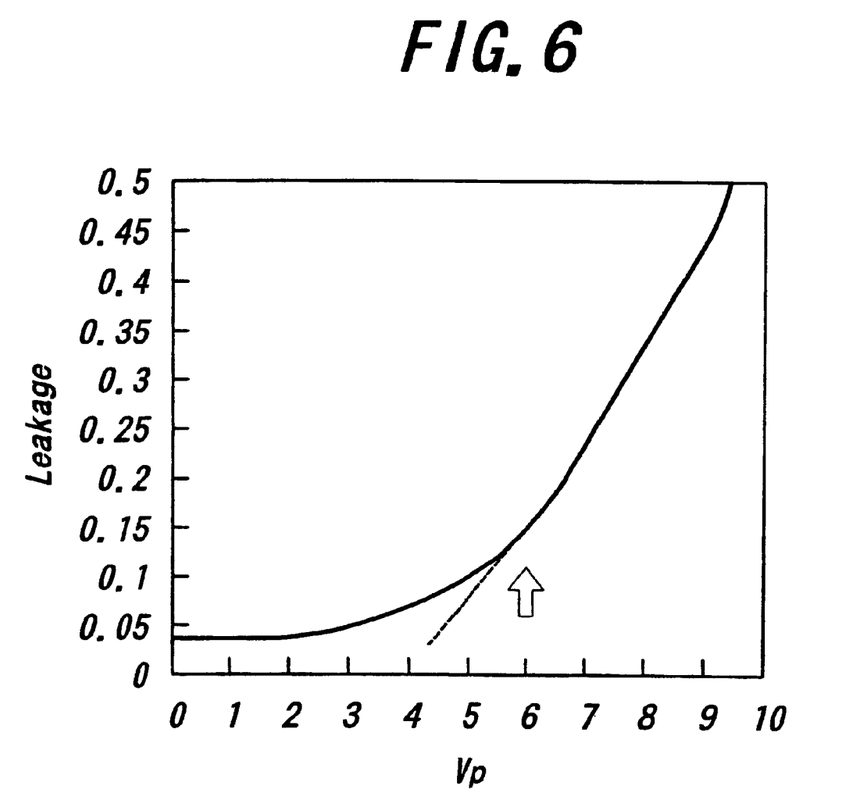
FIG. 6 is a diagram showing another embodiment of the leakage-in amount of the signal from an adjacent record layer to the radius Vp of Airy disc.

Here, if the spacing between record layers of the information record medium is 5 μm, it is preferable to make focal depth z to be ±2.5 μm or less, and the parameter becomes u=8 or less in the case of NA$_{ob}$=0.55. Moreover, in this case, it is understood that the leakage-in amount of the signal from an adjacent record layer becomes as shown in FIG. 6 if this reads from the intensity distribution in parameter u=8 of FIG. 5, and the leakage-in amount increases rapidly with the condition Vp>6.

From the above, as described in claim 1, by setting pin-hole radius r to satisfy conditions 3≦Vp≦6, the utilizing the efficiency of reflected light from the information record medium is improved, the quantity of light incident on the photo detector can be ensured enough and the resolution in the layer direction of the information record medium is improved, so that the reading of information recorded in the desired record layer becomes possible with high resolution.

According to the invention of claim 4, in the optical pick-up device described in claim 1, the collimator lens is arranged between the semiconductor laser and the objective lens.

According to the invention of claim 2, the laser light from the semiconductor laser is collimated to form the parallel light by a collimator lens, thereby becoming infinite optical system incident on the objective lens, so that the laser light can be effectively converged and by arranging the beam splitter in the optical path of the parallel light between for example the collimator lens and the objective lens, the influence by the angle dependency of incident light on the beam splitter can not suffered.

According to the invention of claim 6, in the optical pick-up device described in claim 1, the optical detector consists of a PIN photo diode.

According to the invention of claim 3, the circuit structure can be made easy and cheap by using the PIN photo diode, and the power consumption can be decreased.

According to other embodiment of the present invention, the optical pick-up device comprises a detection optical system and a servo optical system, said detection optical system comprising a first semiconductor laser, an information record medium having plural record layers laminated thereon, a first outward route system for irradiating laser light irradiated from the first semiconductor laser on to the information record medium through wavelength selection element and objective lens, and a first inward route system having a first light detector for receiving the light reflected from the information record medium by transmitting through the objective lens, the wavelength selection element and the pin-hole; and said servo optical system comprising a second semiconductor laser, an information record medium having plural record layers laminated thereon, a second outward route system for irradiating the laser light irradiated from the second semiconductor laser onto the information record medium through the beam splitter, the collimator lens, the wavelength selection element, and the objective lens, and a second inward route system having a second light detector for receiving light reflected from the information record medium by transmitting through the objective lens, the wavelength selection element and the beam splitter.

BRIEF DESCRIPTION OF THE DRAWINGS

The present invention will be further explained in detail hereinafter with reference to the accompanying drawings, in which.

DESCRIPTION OF THE PREFERRED EMBODIMENTS

Figure 1:
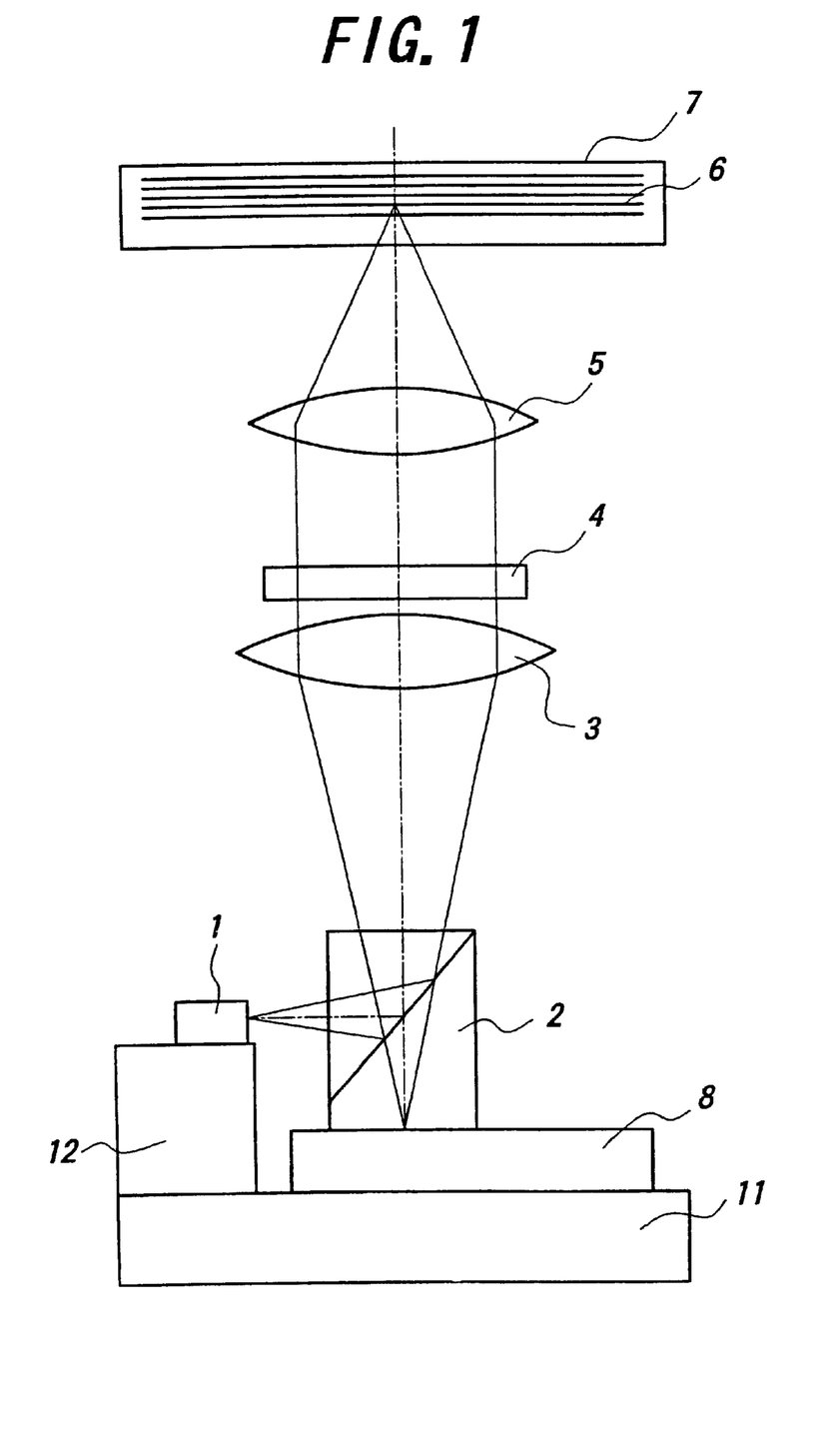
FIG. 1 is an entire outline block diagram showing one embodiment of the present invention.
Figure 2A:
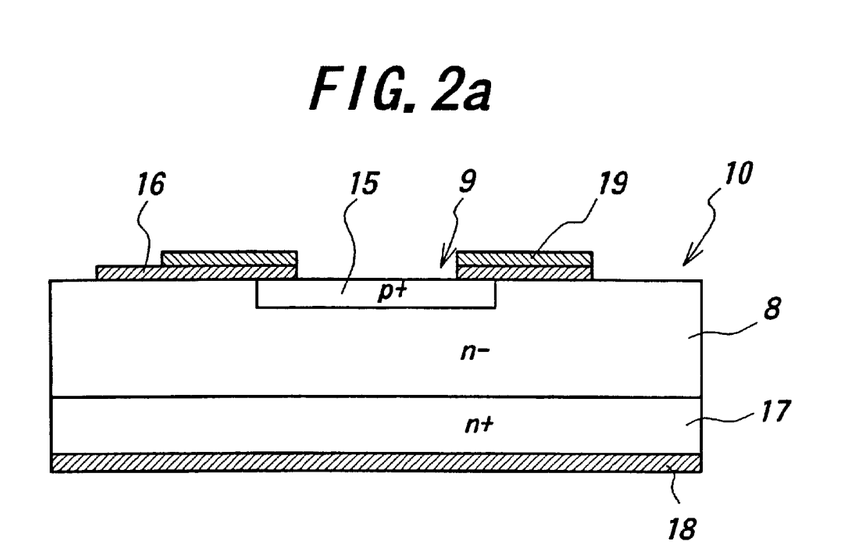
FIGS. 2(a) and 2(b) are a cross-sectional view and a plan view showing the semiconductor substrate shown in FIG. 1.
Figure 2B:
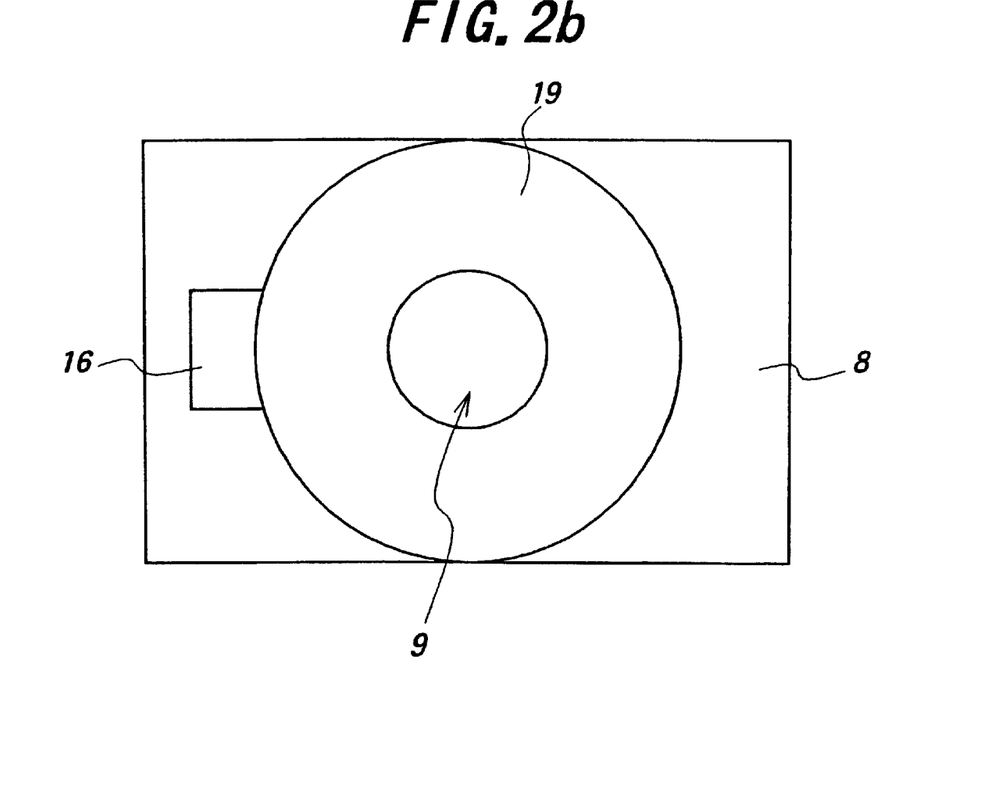

Hereafter, the embodiment of the optical pick-up device according to the present invention is explained referring to the drawing. FIGS. 1, 2(a) and 2(b) show one embodiment of the present invention; FIG. 1 is a whole outline block diagram, and FIGS. 2(a) and 2(b) are a cross-sectional view and a plan view of a semiconductor substrate shown in FIG. 1. In this embodiment, the laser light of linearly polarized light from a semiconductor laser 1 is irradiated on a polarization beam splitter 2 with S polarized light and reflected by the polarization beam splitter 2. The laser light reflected by the polarization beam splitter 2 is made a parallel light with a collimator lens 3, and then is irradiated so as to converge it on a desired record layer of an information record medium 7 on which plural record layers 6 are laminated, by an objective lens 5 through a ¼ wave plate 4.

Moreover, the light reflected at the information record medium 7 traces a path opposite to the approach route, and thus is made incident on the polarization beam splitter 2 through the objective lens 5, the ¼ wave plate 4, and the collimator lens 3. Herein, the light reflected from the information record medium 7 and incident on the polarization beam splitter 2 has been transmitted through the ¼ wave plate 4 twice to become P polarized light, so that the P polarized light transmits through the polarization beam splitter 2. Reflected light from information record medium 7 and transmitted through the polarization beam splitter 2 is received on a PIN photo diode 10 through a pin-hole 9 formed in a semiconductor substrate 8, so that the information recorded on the desired record layer 6 of the information record medium 7 can be reproduced.

Moreover, the semiconductor laser 1 is secured to a platform 12 mounted on a base 11. Moreover, the semiconductor substrate 8 is secured to the base 11, and the polarization beam splitter 2 is secured to the portion having the pin-hole 9 and the PIN photo diode 10 on the semiconductor substrate 8 with bonding.

The PIN photo diode 10 comprises a p+ region 15 provided on the surface side of the n− semiconductor substrate 8 such as silicon or the like, a p-side electrode 16 connected to the p+ region 15 and consisting of Al or the like, and an n-side electrode 18 consisting of Al or the like, and connected through an n+ layer 17 to the back side of the substrate 8.

Moreover, in this embodiment, the pin-hole 9 comprises a p-side electrode 16 of the PIN photo diode 10, and a thin film 19 consisting of an organic film or a dielectric substance multilayer film which contains carbon, mounted on the p-side electrode 16.

Thus, the pin-hole 9 is formed by providing the thin film 19 on the p-side electrode 16 consisting of a metallic film, so that stray light due to the light reflected at the pin-hole plane can be effectively prevented and the thickness of the pin-hole 9 in the direction of optical axis can be made thin and thus the reflected light at the desired record layer 6 of the information record medium 7 can be received with efficiency. In this connection, in the case of forming the pin-hole 9 only in a metallic film, the light reflected at the metallic film becomes stray light and there is a fear of irradiation of the light on the PIN photo diode 10. Moreover, in the case of forming the pin-hole 9 only with an organic film or the dielectric substance multilayer film, the film portion must be made thick so as not to transmit the light, so that the precision of the pin-hole decreases, and that it is feared that reception of light reflected at the desired record layer 6 with efficient might become impossible.

Figure 3:
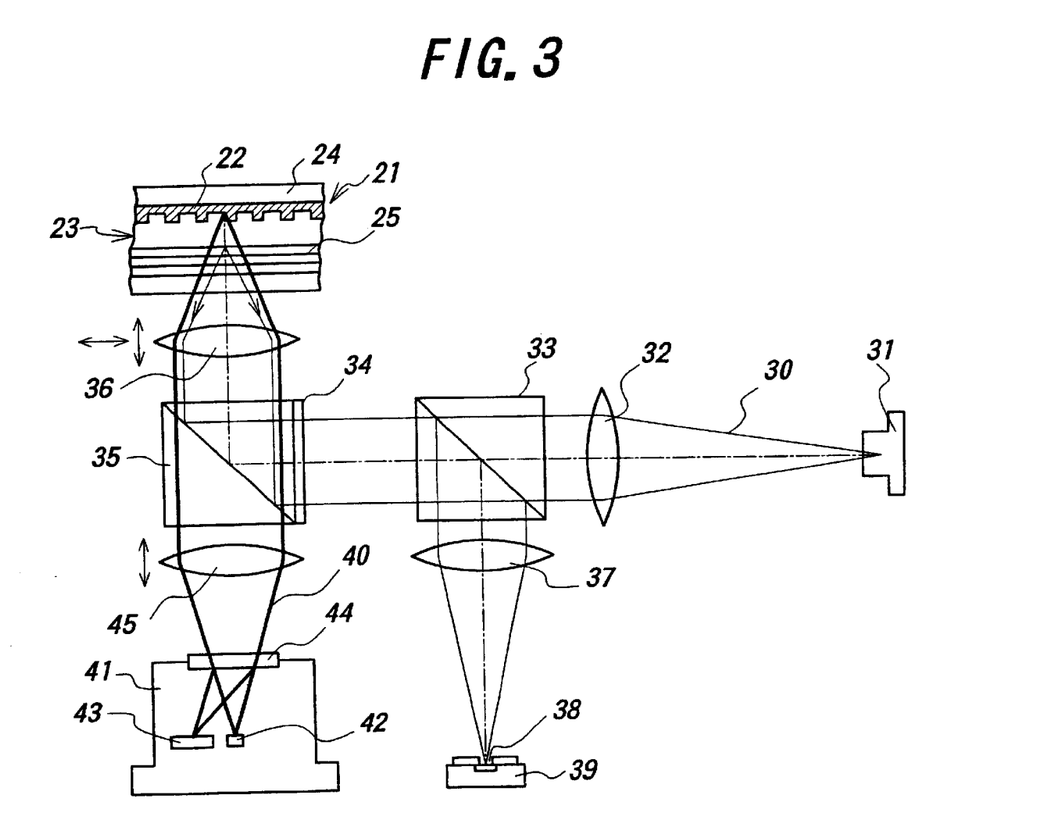
FIG. 3 is an entire outline block diagram showing the second embodiment of the present invention.

In this embodiment, the pin-hole 9 is formed in such a manner that the radius r thereof may become Vp=4. Therefore, assuming that the wave length $\lambda$ of the laser light emanated from, for example, the semi-conductor laser 1 is $\lambda$=0.68 $\mu$m, a focal distance fco and a numerical aperture $NA_{co}$ of the collimator lens 3 are $F_{co}$=12 mm, and $NA_{co}$=0.138, and a focal distance fob and a numerical aperture $NA_{ob}$ of the objective lens 5 are $f_{ob}$=3 mm and $NA_{ob}$=0.55, respectively, radius r becomes r≈3.14 $\mu$m from the above expression (2). Moreover, in the case of $\lambda$=0.65 $\mu$m, the radius becomes r≈3 $\mu$m FIG. 3 is an entire outline block diagram showing another embodiment of the present invention. In FIG. 3, an information record medium 21 comprises a reflection surface 22 having grooves thereon, a medium 23 provided on a plane having the grooves thereon, such as photo polymer, photo refractive crystals and photo chromic materials, a protective layer 24 provided on the other plane of the reflection surface 22, and plural record layers 25 formed at different depth positions of the medium 23. The information is recorded on these record layers by changing its refractive index and light absorption rate. In this embodiment, an information reading laser light 30 for reading recorded information from the side of the medium 23, and a servo laser light 40 for focus controlling and tracking controlling are irradiated on the information record medium 21 to read the information recorded on the desired record layer. Moreover, the wave length of the information reading laser light 30 is made shorter than the wave length of the servo laser light 40.

The information reading laser light 30 is emanated from a semi-conductor laser 31. The laser light emanated from the semiconductor laser 31 is converted into the parallel light by a collimator lens 32 and is irradiated on a polarization beam splitter 33 with P polarized light, so that the laser light transmitted through the polarization beam splitter 33 is irradiated on a dichroic prism 35 through a ¼ wave plate 34, and reflected at a dichroic prism 35. The laser light reflected by the dichroic prism 35 is focused on the information track at the desired record layer 25 of the information record medium 21 by the objective lens 36. The objective lens 36 is constructed so as to drive it in the focusing and tracking directions for the information record medium 21 by two axle actuator not shown.

Moreover, the information reading laser light 30 reflected by the information record medium 21 traces a path opposite to the approach route, and thus is made incident on the polarization beam splitter 33 through the objective lens 36, the dichroic prism 35, and the 114 wave plate 34. Herein, the reflected light incident on the polarization beam splitter 33 from the information record medium 21 can reflect by the polarization beam splitter 33 since this reflected light transmits thorough the ¼ wave plate 34 twice in outward and homeward paths, thereby being become to be S polarized light. The laser light reflected by the polarization beam splitter 33 is focused by a detection lens 37 and received on a PIN photo diode 39 through a pin-hole 38 at the collection point, thereby reproducing the information recorded on the desired record layer 2S of the information record medium 21 based on its output. The pin-hole 38 and the PIN photo diode 39 are formed on the semiconductor substrate as in the same way as explained in for example first embodiment.

On the other hand, a servo laser light 40 is emitted from a light source unit 41. The light source unit 41 is provided with a semiconductor laser 42, a photo detector 43 and a hologram 44, and the servo laser light 40 having a wave length different from the information reading laser light 30 is emanated from the semiconductor laser 42 through the hologram 44. The servo laser light 40 from the light source unit 41 is made a parallel light by a collimator lens 45, and transmitted through the dichroic prism 35 and then focused on the reflection surface 22 of the information record medium 21 by the objective lens 36. The collimator lens 45 is formed so as to drive it in the focusing direction by one axle actuator (not shown).

Moreover, the servo laser light 40 reflected by the information record medium 21 traces the path opposite to the approach route, and is made incident on the hologram 44 of the light source unit 41 through the objective lens 36, the dichroic prism 35, and the collimator lens 45, and then is made diffracted, so that the focusing error signal is detected by a well-known beam size method and a Foucault method, etc., and the tracking error signal is detected by a push-pull circuit method, a phase difference method, and three beam techniques, etc. Objective lens 36 and collimator lens 45 are driven in the focusing direction according to the position of desired record layer 25 to be read out, and the objective lens 36 is driven in the focusing direction and tracking direction based on the above focusing error signal and the tracking error signal, respectively, so that the information reading laser light 30 is focused on the desired record layer 25, and the servo laser light 40 is focused on the reflection surface 22 to control so as to follow the desired information track.

In this constitution, for example, the wave length of information reading laser light 30 emanating from the semiconductor laser 31 is 0.65 μm, the focal distance of the collimator lens 32 is 12 mm, numerical aperture is 0.138, focal distance of objective lens 36 is 3 mm, numerical aperture is 0.55, focal distance of detection lens 37 is 25 mm, numerical aperture is 0.138, wave length of the servo laser light 40 emanating from the semiconductor laser 42 is 0.78 μm, focal distance of collimator lens 45 is 18 mm, and the diameter of the pin-hole 38 is 6 μm so as to satisfy Vp=4. Moreover, assuming that the wave length of information reading laser light 30 is 0.68 μm with Vp=4, the diameter of the pin-hole 38 is 6.3 μm.

By the way, in the conventional optical pick-up device, for example, an astigmatism is given to the lens of the detection system, so that the aberration correction need not consider quite, but as in the above respective embodiment, in the case of confocal optical pick-up device using the pin-hole, assuming that the transfer function of the objective lens and the detection system is to be Hob and Hde respectively, the point image intensity distribution I in the medium is shown by following expression (4). However, the optical system is made a coherent optics system.

$$I = (H_{ob} \times H_{dc})^2 \qquad (4)$$

To maintain the resolution of the spot of such a detection system, it is of course that the transfer function of the detection system should not be deteriorated, and the aberration should be suppressed and the quantity of light eclipsed by the pin-hole should be reduced.

Then, as a suitable embodiment of the present invention, in the above respective embodiments, the amount of the aberration, to which the quantity of light transmitted through the pin-hole, is deteriorated 10 percent, is assumed to be tolerance value. In this case, the entire transmitted wave aberration of the objective lens and the detection system may be substantially 0.05 λrms or less from following expression (5) by the rms value, so that for example, respective transmitted wave aberrations of the objective lens and the detection system are assumed to be 0.035 λrms or less. Moreover, the present invention explained the convergent lens (for example, the collimator lens 3 of FIG. 1 and the detection lens 37 of the FIG. 3 or the like) as a numerical aperture of the detection system by an infinite optical system, but in the case of the finite optical system, the lens numerical aperture of the detection system; NA becomes an objective lens.

$$I(p) = 1 - (2\pi/\lambda)^2 (\Delta\phi p)^2 = 0.9$$

However, $(\Delta\phi p)^2$: a root-mean-squarer of the wave aberration $$\{(\Delta\phi p/\lambda)^2\}^{1/2} = \{0.1/(2\pi)^2\}^{1/2} \qquad (5)$$

$\Delta\phi p \approx 0.05$ λrms

Thus, if the entire transmitted wave aberration of the objective lens and the detection system is substantially 0.05 λrms or less, the reflected light from the information record medium focused to the desired record layer can be received more efficiently. Moreover, the present invention explained the convergent lens (for example, the collimator lens 3 of FIG. 1 and the detection lens 37 of the FIG. 3 or the like) as a numerical aperture of the detection system by an infinite optical system, but in the case of the finite optical system, the lens numerical aperture of the detection system; NA becomes an objective lens.

As described above, according to the present invention, in case of receiving the reflected light from the information record medium having the plural record layers in the depth direction on the photo detector through the pin-hole, assuming that the radius of the pin-hole is r, the numerical aperture of the detection system of the reflected light is NA, the wave length of the laser light is λ, and the radius of Airy disc is Vp, Vp=2π·r/(λ/NA) might satisfy the following condition 3≦Vp≦6, so that the light focused onto the desired record layer and reflected from the information record medium can be received with efficient, and information can reproduced accurately.

Moreover, the light reflected at and focused on the desired record layer can be received efficiently, so that the PIN photo diode can be used as a photo detector, as a result, the circuit structure can be made easy and cheap, and thus the power consumption can be decreased.

What is claimed is:

1. An optical pick-up device comprising: a semiconductor laser, an information record medium having plural record layers laminated thereon, an outward route system for irradiating laser light from the semiconductor laser onto the information record medium through a beam splitter and objective lens, and an inward route system having a light detector for receiving the light reflected from the information record medium and transmitted through the objective lens, the beam splitter and pin-hole; the pin-hole having a radius, which is decided in such a manner that an expression Vp=2π/(λ/NA) satisfies following condition 3≦Vp≧6, wherein r is radius of the pin-hole, NA is lens aperture of the detection system, λ is wave length of the laser light, and Vp is radius of Airy disc.

2. An device according to claim 1, wherein the information is recorded in the information recording medium, which is made disc-shaped by taking advantage of at least the thermal energy of light irradiated onto the information recording medium into consideration.

3. An optical pick-up device according to claim 2, wherein the information record medium comprises a group of plural record layers which are laminated on each other, a protective layer provided on one side of the record layer group, and a reflective layer having pre-grooves provided on the other side thereof through a spacer layer.

4. An optical pick-up device according to claim 1, wherein the information record medium comprises a group of plural record layers which are laminated on each other, a protective layer provided on one side of the record layer group, and a reflective layer having pre-grooves provided on the other side thereof through a spacer layer.

5. An optical pick-up device according to claim 1, wherein the collimator lens is arranged between the semiconductor laser and the objective lens.

6. An optical pick-up device according to claim 1, wherein the semiconductor laser is secured on the base through a platform, the semiconductor substrate is secured on the base, and the beam splitter is secured to the semiconductor substrate so as to oppose it to the pin-hole and the light detector.

7. An optical pick-up device according to claim 6, wherein the light detector consists of a PIN photo diode.

8. An optical pick-up device according to claim 6, wherein the pin-hole is formed in an organic film or a dielectric substance multilayer film, which include carbon and are provided on the p type electrode of the PIN photo diode.

9. An optical pick-up device according to claim 1, wherein the light detector consists of a PIN photo diode.

10. An optical pick-up device according to claim 1, wherein the pin-hole is formed in an organic film or a dielectric substance multilayer film, which include carbon and are provided on the p type electrode of the PIN photo diode.

11. An optical pick-up device according to claim 1 further comprising: a detection optical system and a servo optical system, said detection optical system comprising a first semiconductor laser, an information record medium having plural record layers laminated thereon, a first outward route system for irradiating laser light irradiated from the first semiconductor laser on to the information record medium through wavelength selection element and objective lens, and a first inward route system having a first light detector for receiving the light reflected from the information record medium by transmitting through the objective lens, the wavelength selection element and the pin-hole; and said servo optical system comprising a second semiconductor laser, an information record medium having plural record layers laminated thereon, a second outward route system for irradiating the laser light irradiated from the second semiconductor laser onto the information record medium through the beam splitter, the collimator lens, the wavelength selection element, and the objective lens, and a second inward route system having a second light detector for receiving light reflected from the information record medium by transmitting through the objective lens, the wavelength selection element and the beam splitter.

12. An optical pick-up device according to claim 11, wherein the wavelength selection element is a dichroic prism.

13. An optical pick-up device according to claim 11, wherein the beam splitter is formed by a hologram element.

14. An optical pick-up device according to claim 11, wherein the collimator lens is made movable in an optical axis direction and/or in a direction orthogonal to the optical axis direction.

* * * * *